No. 606,799. Patented July 5, 1898.
W. A. CALLANAN.
HAT FASTENER.
(Application filed Feb. 11, 1897.)
(No Model.)
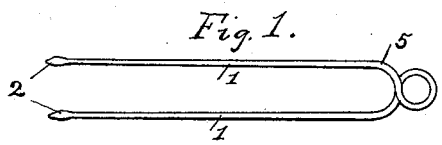
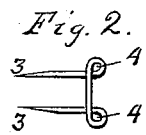
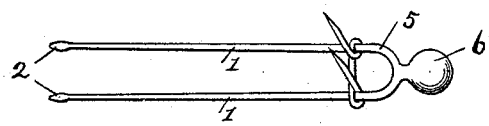
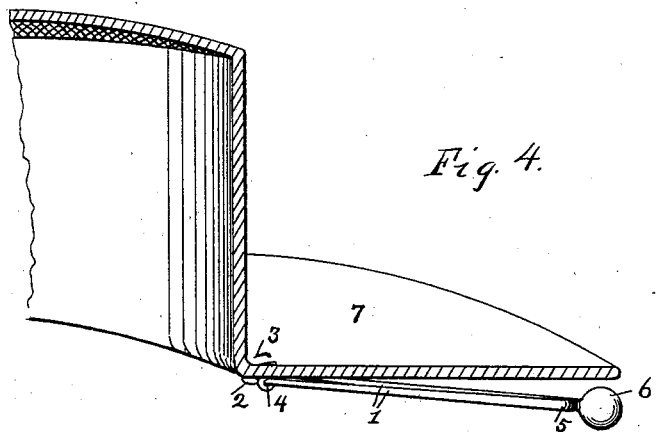
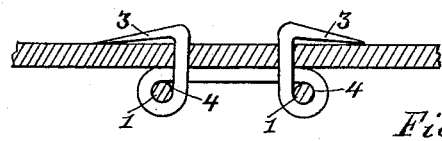
WITNESSES: INVENTOR
William A. Callanan
BY
Frank McClintock
ATTORNEY.

UNITED STATES PATENT OFFICE.

WILLIAM A. CALLANAN, OF COLORADO SPRINGS, COLORADO.

HAT-FASTENER.

SPECIFICATION forming part of Letters Patent No. 606,799, dated July 5, 1898.

Application filed February 11, 1897. Serial No. 623,022. (No model.)

*To all whom it may concern:*

Be it known that I, WILLIAM A. CALLANAN, a citizen of the United States, residing at Colorado Springs, in the county of El Paso and State of Colorado, have invented a new and useful device, a Fastener for Ladies' Hats, of which the following is a specification.

My invention relates to improvements in pins or fasteners for securing hats to the head in which the pin proper is adapted to move through a supporting device which may be permanently secured to the brim of the hat; and the object of my improvement is to provide a two-pronged pin formed of a single piece of wire having enlarged ends and tapering prongs permanently connected to and adapted to have a sliding movement through a supporting device formed of a properly-bent single piece of wire adapted to be readily secured to the brim or other part of the hat.

My invention is fully disclosed in the following specification and accompanying drawings, in which—

Figure 1 is a view of the pin proper. Fig. 2 is a view of the device for securing the pin to the hat. Fig. 3 is a view of the fastener complete ready for use. Fig. 4 is a view, partly sectional and partly perspective, showing the fastener attached to a hat; and Fig. 5 is an enlarged sectional view showing more clearly the manner of securing the fastener to the hat.

Similar figures refer to similar parts in each of the views.

The pin proper, Fig. 1, which enters the hair, is preferably constructed of a single piece of wire bent so as to form two parallel prongs 1 1, with the ends enlarged into an elliptical knob or flattened out so as to broaden them, as shown at 2 2. The loop or knob 6 is of a convenient size and shape for grasping between the thumb and finger when pushing it into or withdrawing it from the hair. If a knob is used, as in Figs. 3 and 4, it may be either plain or ornamental, as in an ordinary hat-pin. In its cheapest form a simple loop of the wire forming the pin is used, as shown in Fig. 1.

In order to avoid injury to the hat occasioned by sticking the pin through the crown thereof, as is the usual practice, a device (shown in Fig. 2) is used to secure the pin to the brim or sweat-band of the hat. It is formed of a single piece of wire, with pointed ends 3 3. The prongs 1 1 of the pin pass through the loops 4 4. Each of the prongs 1 1 is made slightly tapering, and the loops 4 4 are of such size that when the prongs are pushed through said loops to the shoulders 5 5 they will fit so tightly as to prevent their coming out accidentally. The knobs or flattened ends 2 2 prevent the pin from being entirely withdrawn from the loops 4 4 of the holding device, Fig. 2. Fig. 4 shows the pin proper and holding device properly connected together and secured to the brim of a hat 7, the pin being withdrawn to a position to allow of the hat being placed on the head. It is preferable to use two of the fasteners, one on each side of the hat. When the hat is in position on the head, the prongs 1 1 of the pins are, by means of the loops or knobs 6, pushed into the hair, securely fastening the hat to the head. The fastener is secured to the hat by forcing the points 3 3 through the brim or other part of the hat to which it may be desired to secure it and then bending the ends of the wires over, as shown in Fig. 4.

I am aware that the use of a two-pronged pin adapted to have a sliding movement through a device which may be used for connecting it to the hat is not patentable, broadly; but heretofore the means for securing the device to the hat and also for holding the pin securely in place when pushed into the hair have been complicated and expensive.

Having described my invention, what I claim as new, and desire to secure by Letters Patent, is—

In a hat-fastener the combination with a holding device formed of a single piece of wire bent into rectangular form with pointed or sharpened ends, and having eyes formed by the looping of the wire at the angles of the said device, adapted to spring or give slightly, of a two-pronged pin having the prongs tapering and adapted to wedge tightly when pushed entirely into the eyes or loops of the holding device, and knobs or enlargements at the extremities of the prongs substantially as specified.

WILLIAM A. CALLANAN.

Witnesses:
  MARGARET DORAN,
  JANE C. CALLANAN.